April 29, 1952     G. ALEXANDER ET AL     2,594,838
MOLDED TUBULAR BODY
Filed March 4, 1947
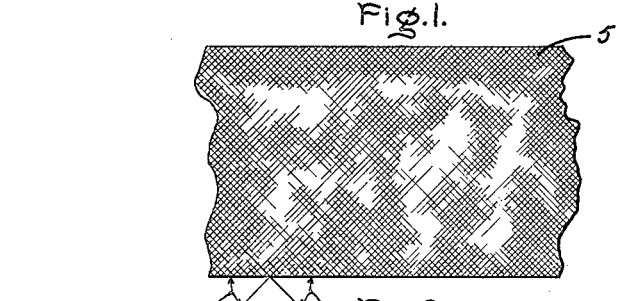
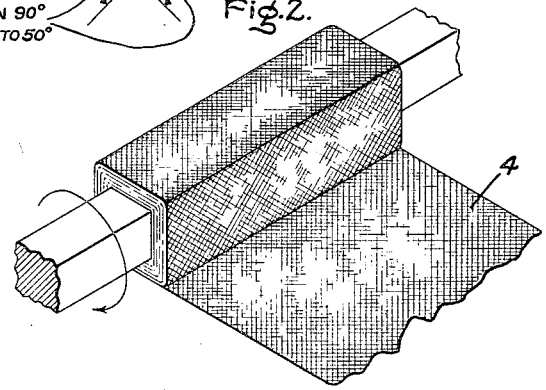
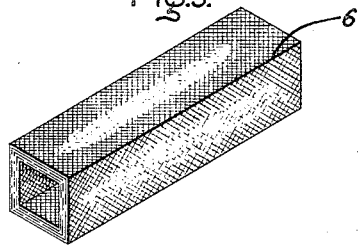
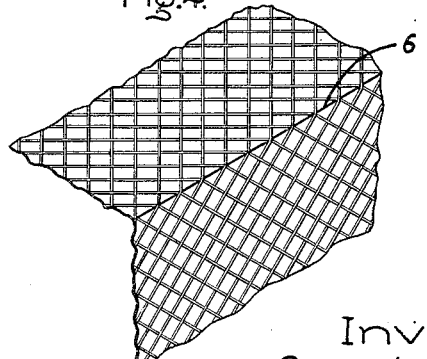
Inventors:
George Alexander,
Richard T. Walsh,
by *[signature]*
Their Attorney.

Patented Apr. 29, 1952

2,594,838

UNITED STATES PATENT OFFICE 2,594,838

MOLDED TUBULAR BODY

George Alexander, Coshocton, and Richard T. Walsh, West Lafayette, Ohio, assignors to General Electric Company, a corporation of New York Application March 4, 1947, Serial No. 732,328

1 Claim. (Cl. 138—76)

This invention relates to molded tubular bodies having either a polygonal or channel shape and methods of making the same. More particularly, this invention relates to a hollow laminated polygonal tubular body having a polygonal cross-section and comprising a plurality of superposed layers of woven fabric whose warp and woof strands are at an acute angle to the longitudinal axis of the said body, the laminations being bound together by a thermoset synthetic resin.

Our polygonal shaped bodies may assume a rectangular, e. g., a square, or tubular shape, or when it is desired to use our invention as insulation for rotating machinery it may assume a channel shape. For convenience, in the following description of our invention we will refer to our claimed structure as being of tubular shape.

We have found that our finished structure may have varied uses and applications in the electrical field, particularly in the field of electrical conductors where it may serve as a conduit for cables and the like.

In the field of molding hollow polygonal tubular bodies constructed of glass fabrics impregnated with a potentially thermosetting or heat-convertible synthetic resin, difficulty has been experienced in obtaining an article that does not split at the corners. In the usual process of making these tubular bodies, the glass cloth or fabric is first treated with a synthetic resin, for example, a phenol-aldehyde condensation product, and the resin-treated fabric is wound around a mandrel which may assume any shape. The mandrel, with the material thereon, is then placed in a mold and the resin is cured to the substantially infusible and insoluble state under heat and pressure. After the molding operation the mandrel is removed and the flash is trimmed off the tube. In these operations, the warp strands of the fabric are wound at right angles to the longitudinal axis of the tube. Hence, when pressure is applied during the molding operation, the warp strands of the fabric are folded flat upon themselves and have a tendency to break at the corners because of the pinching action of the mold during the molding operation. This results in large losses of material due to the splitting of the tube at the flash line. In these conventional processes of molding resin-impregnated glass fabric tubing, the scrap involved due to the splitting along the corners when the flash is removed may run as high as 80 per cent.

We have now discovered that by winding the tube in such a manner that the warp and woof strands of the glass fabric are not at right angles, i. e., these strands are at an acute angle, to the tube's longitudinal axis, the fibers do not fold upon themselves and hence do not break. By means of our invention, the side compression strength of the final product is greater and in many cases more than double that of the old product molded according to the usual process now employed in the art. To obtain this improved article comprising a polygonal tubular body composed of resin-impregnated glass fabric, we wind the tubes on the bias, i. e., the warp strands are at an angle less than 90° to the longitudinal axis of the tube. By this process we have been able to mold a rigid polygonal tubular member using potentially thermosetting resins and glass fabric and having the foregoing and other greatly improved physical and electrical characteristics.

One method of practicing our invention comprises impregnating the glass cloth or fabric with a potentially thermosetting resin. Although the glass cloth may assume any thickness, we prefer to use about a three mil glass cloth and impregnate it with a synthetic resin until the resin comprises, by weight, about 40 to 60 per cent, preferably about 50 per cent of the total weight of resin and cloth. We prefer to use as the impregnating resins either a melamine-formaldehyde or a phenol-formaldehyde condensation product. However, other potentially thermosetting resins may also be used, for example, saturated and unsaturated alkyd resins, urea-aldehyde resins, etc. The glass fabric is preferably impregnated with the resin prior to wrapping it around the mandrel. Several layers of the cloth may be wrapped around the mandrel to obtain any desired wall thickness. For example, we have found that a wall thickness of $\frac{1}{16}''$ 3 mil glass cloth requires about 30 turns of the treating material. It will of course be understood by those skilled in the art, that tubes of any size or wall thickness may be made according to our claimed process. In preparing tubes of conventional size, we use a 24" mandrel in a 20" mold and trim the molded tubes so that the final product is about 18" in length.

In the drawings:

Fig. 1 is a plan view of a strip of material employed in making our claimed structures.

Fig. 2 is a perspective view of our invention and illustrates the manner in which the bias wound fabric square tubes are formed.

Fig. 3 is a perspective view of an example of our claimed finished product.

Fig. 4 is an enlarged view of a portion of Fig. 3 along an outside edge.

Fig. 5 is a transverse cross-sectional view of a modified form of our claimed invention.

Referring to the drawings, particularly to Fig. 1, it will be seen that the cover strip 5 consists of a piece of glass cloth or fabric cut on the bias so that the warp and woof strands are each at an angle of about 90° to each other, and are each at an angle of less than 90° to the longitudinal edge of the strip. We find that optimum results are obtained when the warp and woof strands of the woven glass fabric are each at an angle of from 40° to 50° to the longitudinal edge of the woven glass fabric, or at an angle of from 40° to 50° to the longitudinal axis of the tubular body. Instead of cutting cloth on the bias, it will be apparent to those skilled in the art that cloth may be woven initially so that the warp and woof strands are each at an acute angle to the lengthwise direction of the cloth.

Fig. 2 illustrates the manner in which this invention may be practiced. From this figure, it will be seen that the tubing material comprises glass fabric woven on the bias, as shown at 4, the said fabric being impregnated with a potentially thermosetting resin. Fig. 3 illustrates an example of our finished product wherein the corner 6 shows the warp and woof strands crossing each other at angles less than 90° to the axis of the tube. In Fig. 5 we have shown a transverse cross-sectional view of a channel-shaped structure which may be prepared in accordance with our claimed process.

In order that those skilled in the art may better understand how the present invention may be practiced, the following example is given by way of illustration and not by way of limitation.

Glass cloth, about 3 mils in thickness, was impregnated with a potentially thermosetting resinous condensation product of melamine and formaldehyde until the resin cloth comprised about 50 per cent, by weight, of the total weight of the cloth and resin. The warp and woof strands of the glass cloth were at an angle of approximately 45° to the lengthwise direction of the cloth.

The resin-impregnated glass cloth was wound 30 times around a square cross-sectioned mandrel so that the warp and woof strands were at an angle of about 45° to the longitudinal axis of the mandrel. The complete assembly was placed in a square mold and molded for 30 minutes at 140° C. at about 1200 p. s. i. to obtain a bias-wound, square tube.

As a control, a 3 mil glass cloth in which the warp and woof strands were at right angles and in which the warp strands were parallel to the lengthwise direction of the cloth and containing 50 per cent of the above-mentioned melamine-formaldehyde condensation product, was also wound 30 times around the above-mentioned square mandrel so that the warp strands made an angle of 90° with the longitudinal axis of the mandrel. The complete assembly was heated and pressed in the same square mold mentioned above using the same cure cycle as employed for pressing the bias-wound glass cloth tube above.

The two tubes were stripped from the mandrel and tested for flexural and compression strengths. The following table shows the results of these tests:

Table

|  | Bias Wound | Straight Wound |
| --- | --- | --- |
| Flexural Strength, lbs./sq. in | 547 | 545 |
| Compression Strength, Side, lbs./sq. in | 1,400 | 650 |

The results of these tests clearly indicate that whereas the flexural strengths of the tubes are about equal, the side compression strength is more than twice as great for bias-wound tubes as compared with the side compression strength of straight-wound tubes.

It is to be understood that we do not intend to limit ourselves to the particular shape or form of any part shown, nor do we intend to limit ourselves to the precise arrangement of the parts with respect to each other. Nor do we limit ourselves, as above stated, to any particular resinous impregnating material.

It is to be understood that the above description and drawings are merely illustrative and that the invention is not to be limited in any respect, except as defined in the subjoined claim.

What we claim as new and desire to secure by Letters Patent of the United States is:

A rectangular shaped molded hollow tubular rigid body composed of a single piece of material comprising a plurality of layers of a continuous web of a glass fabric bonded together and impregnated with a thermoset synthetic resin wherein the warp and woof strands of said tube are each at an angle of from 40° to 50° to the longitudinal axis of said tube.

GEORGE ALEXANDER.
RICHARD T. WALSH.

REFERENCES CITED

The following references are of record in the file of this patent:

UNITED STATES PATENTS

| Number | Name | Date |
| --- | --- | --- |
| 706,466 | Stowe | Aug. 5, 1902 |
| 1,205,345 | Hatfield | Nov. 21, 1916 |
| 1,375,283 | Dunbar | Apr. 19, 1921 |
| 1,400,078 | Kempton | Dec. 13, 1921 |
| 1,414,001 | Trist | Apr. 25, 1922 |
| 1,628,832 | Falor | May 17, 1927 |
| 2,174,431 | Wentzell | Sept. 26, 1939 |
| 2,314,701 | Harvey | Mar. 23, 1943 |
| 2,383,733 | Parker | Aug. 28, 1945 |
| 2,468,493 | Greenwald | Apr. 26, 1949 |

OTHER REFERENCES

Product Engineering, "Plastics for Present and Post-War Products," September 1943.